United States Patent [19]

Nishikawa et al.

[11] Patent Number: 5,478,682
[45] Date of Patent: Dec. 26, 1995

[54] METHOD FOR DOMAIN-DIVIDING LIQUID CRYSTAL ALIGNMENT FILM AND LIQUID CRYSTAL DEVICE USING DOMAIN-DIVIDED ALIGNMENT FILM

[75] Inventors: Michinori Nishikawa; Masayuki Endoh, both of Yokohama; Yusuke Tsuda, Kurume; Nobuo Bessho, Yokohama, all of Japan

[73] Assignee: Japan Synthetic Rubber Co., Ltd., Tokyo, Japan

[21] Appl. No.: 248,207

[22] Filed: May 24, 1994

[30] Foreign Application Priority Data

May 27, 1993 [JP] Japan .................. 5-126000

[51] Int. Cl.$^6$ .................. G02F 1/1337
[52] U.S. Cl. .................. 430/20; 359/75; 359/76; 430/320; 430/321; 430/326; 430/331
[58] Field of Search .................. 359/75, 76; 430/20, 430/320, 321, 326, 331

[56] References Cited

U.S. PATENT DOCUMENTS

| 3,475,171 | 10/1969 | Alles | 430/331 |
|---|---|---|---|
| 4,828,965 | 5/1989 | West et al. | 430/331 |
| 4,873,177 | 10/1989 | Tanaka et al. | 430/326 |
| 5,185,235 | 2/1993 | Sato et al. | 430/331 |
| 5,276,132 | 1/1994 | Nishikawa et al. | 528/353 |

FOREIGN PATENT DOCUMENTS 0549283  6/1993  European Pat. Off. .

OTHER PUBLICATIONS

Japan Display '92—Proceedings of the International Display Research Conference, pp. 591–594, K. Takatori, et al., "A Complementary TN LCD with Wide–Viewing–Angle Grayscale".

*Primary Examiner*—Charles L. Bowers, Jr.
*Assistant Examiner*—J. Pasterczyk
*Attorney, Agent, or Firm*—Oblon, Spivak, McClelland, Maier & Neustadt

[57] ABSTRACT

A method for domain-dividing a liquid crystal alignment film, which comprises (1) applying a radiation-sensitive resin composition onto a liquid crystal alignment film aligned in one direction and formed on a substrate, (2) exposing the radiation-sensitive resin composition through a predetermined pattern, (3) carrying out a development with an aqueous solution containing 0.01 to 1.5% by weight of an alkaline compound to partially protect the liquid crystal alignment film, (4) aligning an exposed portion of the liquid crystal alignment film in another direction and (5) removing the radiation-sensitive resin composition; and a liquid crystal device having a liquid crystal display device with the domain-divided liquid crystal alignment film.

15 Claims, No Drawings

METHOD FOR DOMAIN-DIVIDING LIQUID CRYSTAL ALIGNMENT FILM AND LIQUID CRYSTAL DEVICE USING DOMAIN-DIVIDED ALIGNMENT FILM

FIELD OF THE INVENTION

The present invention relates to a method for domain-dividing a liquid crystal alignment film and a liquid crystal device using a domain-divided liquid crystal alignment film. More specifically, it relates to a method for domain-dividing a liquid crystal alignment film, which gives liquid crystal cells excellent in electric properties and liquid crystal alignment properties, and a liquid crystal device using a domain-divided liquid crystal alignment film.

PRIOR ART

There are known liquid crystal display devices (TN and STN display devices) having TN and STN liquid crystal cells in which a nematic liquid crystal having positive dielectric anisotropy is sandwiched with transparent electrode-attached substrates having liquid crystal alignment films formed of polyimide and major axes of liquid crystal molecules can be continuously twisted from 90° to 270° between the substrates. However, these TN and STN display devices have a problem in that the viewing angle of display is narrow particularly for the display of a gray scale tone, since the display is switched on and off using the rise and decay of liquid crystal molecules having the anisotropy of refractive index. For overcoming this problem, it has been reported that the viewing angle of display can be broadened by applying a radiation-sensitive resin composition onto a liquid crystal alignment film to partially protect the liquid crystal alignment film so that the alignment is divided (SID '92 Digest, p. 792, Japan Display '92 Digest, p. 591). In general, however, the above radiation-sensitive resin composition is selected from those used for semiconductors, and an aqueous solution containing 2.38% by weight of tetramethylammonium hydroxide (TMAH) which is an alkaline compound is used as a developer solution. There is therefore a problem in that the so-obtained liquid crystal display device has a problem in that it is poor in electric properties and the liquid crystal is poor in alignment properties.

SUMMARY OF THE INVENTION

It is an object of the present invention to provide a method for domain-dividing a liquid crystal alignment film, which overcomes the above problems and which is free from deteriorating the electric properties of a liquid crystal display device and the alignment properties of a liquid crystal.

It is another object of the present invention to provide a liquid crystal device provided with a liquid crystal display device having a liquid crystal alignment film of which the alignment has been divided by the above domain-dividing method.

Other objects and advantages of the present invention will be apparent from the following description.

Studies have been diligently made to overcome the above problems, and it has been found that the deterioration of the electric properties of a liquid crystal display device and the alignment properties of a liquid crystal can be prevented by decreasing the content of an alkaline compound in a developer solution used for developing a radiation-sensitive resin composition.

According to the present invention, the above objects and advantages of the present invention are achieved, first, by a method for domain-dividing a liquid crystal alignment film, which comprises (1) applying a radiation-sensitive resin composition onto a liquid crystal alignment film aligned in one direction and formed on a substrate, (2) exposing the radiation-sensitive resin composition through a predetermined pattern, (3) carrying out a development with an aqueous solution containing 0.01 to 1.5% by weight of an alkaline compound to partially protect the liquid crystal alignment film, (4) aligning an exposed portion of the liquid crystal alignment film in another direction and (5) removing the radiation-sensitive resin composition.

Further, the above objects and advantages of the present invention are also achieved by a method as described above, wherein the above radiation-sensitive resin composition contains (A) a polymer containing an unsaturated carboxylic acid and/or an unsaturated carboxylic acid anhydride (to be referred to as "specific polymer" hereinafter) and (B) a radiation-sensitive, acid-forming compound.

The liquid crystal alignment film used in the present invention is mainly formed from a polyamic acid obtained by a reaction between a tetracarboxylic acid dianhydride and a diamine compound and/or a polyimide which is an imidization polymer thereof.

Examples of the above tetracarboxylic acid dianhydride include aliphatic and alicyclic tetracarboxylic acid dianhydrides such as butanetetracarboxylic dianhydride, 1,2,3,4-cyclobutanetetracarboxylic dianhydride, 1,2,3,4--cyclopentanetetracarboxylic dianhydride, 2,3,5-tricarboxycyclopentylacetic dianhydride, tetracyclo-[6,2,1, 1,0$^{2,7}$] dodeca-4,5,9,10-tetracarboxylic dianhydride, 3,5,6-tricarboxylnorbornane-2-acetic dianhydride, 2,3,4,5-tetrahydrofurantetracarboxylic dianhydride, 1,3,3a, 4,5,9b-hexahydro-5-(tetrahydro-2,5-dioxo-3-furanyl)-naphtho[1,2-c]-furan-l, 3-dione, 5-(2,5-dioxotetrahydrofural)-3-methyl-3-cyclohexene1,2-dicarboxylic dianhydride and bicyclo [2.2.2]-oct-7-ene-2,3,5,6-tetracarboxylic dianhydride; and aromatic tetracarboxylic acid dianhydrides such as pyromellitic dianhydride, 3,3', 4,4'-benzophenonetetracarboxylic dianhydride, 3,3', 4,4'-biphenylsulfonetetracarboxylic dianhydride, 1,4,5,8-naphthalenetetracarboxylic dianhydride, 2,3,6,7-naphthalenetetracarboxylic dianhydride, 4,4'-oxybis(phthalic acid) dianhydride, 3,3', 4,4'-dimethyldiphenylsilanetetracarboxylic dianhydride, 3,3', 4,4'-tetraphenylsilanetetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy) diphenylpropane dianhydride, 3,3', 4,4'-perfluoroisopropylidenediphthalic dianhydride, 3,3', 4,4'-biphenyltetracarboxylic dianhydride, bis(phthalic acid)phenylphosphine oxide dianhydride, p-phenylene-bis-(triphenylphthalic acid) dianhydride, m-phenylene-bis-(triphenylphthalic acid) dianhydride, bis(triphenylphthalic acid)-4,4'-diphenyl ether dianhydride and bis(triphenylphthalic acid)-4,4'-diphenylmethane dianhydride.

Of the above tetracarboxylic acid dianhydrides, preferred are butanetetracarboxylic dianhydride, 1,2,3,4-cyclobutanetetracarboxylic dianhydride, 2,3,5-tricarboxycyclopentylacetic dianhydride, tetracyclo-[6,2,1,1,$^{2,7}$]dodeca-4,5,9,10-tetracarboxylic dianhydride, 5-(2,5-dioxotetrahydrofural)-3-methyl-3-cyclohexene-1,2-dicarboxylic dianhydride, 1,3, 3a,4,5,9b-hexahydro-5-tetrahydro-2,5-dioxo-3-furanyl)naphtho[1,2-c]-furan-1,3-dione, pyromellitic dianhydride, 3,3',4,4'-benzophenonetetracarboxylic dianhydride, 3,3',4,4'-bisphenylsulfonetetracarboxylic dianhydride, 3,3',4,4'-perfluoropropylidenediphthalic dianhydride and 3,3',4,4'-biphenyltetracarboxylic dianhydride.

Examples of the diamine compound include aromatic diamines such as p-phenylenediamine, m-phenylenediamine, 4,4'-diaminodiphenylmethane, 4,4'-diaminodiphenylethane, 4,4'-diaminodiphenylsulfide, 4,4'-diaminodiphenyl-sulfone, 4,4'-diaminodiphenyl ether, 1,5-diaminonaphthalene, 3,3'-dimethyl-4,4'diaminobiphenyl, 4,4'-diaminobenzanilide, 3,4'-diaminodiphenyl ether, 3,3'-diaminobenzophenone, 3,4'-diaminobenzophenone, 4,4'-diaminobenzophenone, 2,2bis[4-(4-aminophenoxy)phenyl]propane, 2,2-bis[4-(4aminophenoxy)phenyl]hexafluoropropane, 2,2-bis(4aminophenyl)hexafluoropropane, bis[4-(4aminophenoxy)phenyl]sulfone, 1,4-bis(4aminophenoxy)benzene, 4,4'-(p-phenylenediisopropylidene)bisaniline, 4,4'-(m-phenylenediisopropylidene)bisaniline, 1,3-bis(4aminophenoxy)benzene, 1,3-bis(3-aminophenoxy)benzene, 9,9-bis(4-aminophenyl)-10-hydroanthracene, 9,9-bis(4aminophenyl)fluorene, 4,4'-methylene-bis(2chloroaniline), 2,2',5,5'-tetrachloro-4,4'diaminobiphenyl, 2,2'-dichloro-4,4'-diamino-5,5,'dimethoxybiphenyl and 3,3'-dimethoxy-4,4'diaminobiphenyl; aromatic diamines having hereto atom such as diaminotetraphenylthiophene; aliphatic or alicyclic diamines such as 1,1-m-xylylenediamine, 1,2ethylenediamine, 1,3-propanediamine, tetramethylene-diamine, pentamethylenediamine, hexamethylenediamine, heptamethylenediamine, octamethylenediamine, nonamethylenediamine, 1,4-diaminocyclohexane, isophoronediamine, tetrahydrodicyclopentadienylene-diamine, hexahydro-4,7-methanoindanylenedimethylene-diamine, tricyclo[6,2,1,0$^{2,7}$]-undecylenedimethyldiamine and 4,4'-methylenebis(cyclohexylamine); and diaminoorganosiloxane of the formula,

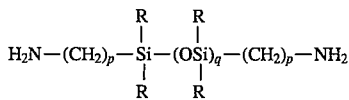

wherein each R is a hydrocarbon group having 1 to 12 carbon atoms which includes an alkyl group such as methyl, ethyl and propyl, a cycloalkyl group such as cyclohexyl and an aryl group such as phenyl, p is an integer of 1 to 3, and q is an integer of 1 to 20.

Of the above diamine compounds, preferred are p-phenylenediamine, 4,4'-diaminodiphenylmethane, 4,4'diaminodiphenyl-ether, 2,2-bis[4-(4-aminophenoxy)phenyl]propane, 9,9-bis(4-aminophenyl)fluorene, 2,2bis[4-(4-aminophenoxy)phenyl]hexafluoropropane, 2,2bis(4-aminophenyl)hexafluoropropane. The above diamine compounds may be used alone or in combination. As the diamine compound, commercially available diamine compounds may be used as they are or after they are re-reduced.

The polyamic acid used in the present invention is obtained by a reaction between the tetracarboxylic acid dianhydride and the diamine compound. This reaction is carried out in an organic solvent at a temperature generally between 0° and 150° C., preferably between 0° and 100° C.

The solvent used for the above reaction is not specially limited if it can dissolve the tetracarboxylic acid dianhydride, the diamine compound and the polyamic acid formed during the reaction. Examples of the solvent include aprotic polar solvents such as γ-butyrolactone, N-methyl-2-pyrrolidone, N,N-dimethylformamide, N,N-dimethylacetamide, dimethylsulfoxide, tetramethylurea and hexamethylphosphortriamide; and phenolic solvents such as m-cresol, xylenol, phenol and halogenated phenol. The organic solvent is generally preferably used in such an amount that the total amount of the tetracarboxylic dianhydride and the diamine compound is 0.1 to 30% by weight of the total amount of a reaction solution.

The tetracarboxylic acid dianhydride and the diamine compound are used in such amounts that the equivalent weight ratio of acid anhydride group of the tetracarboxylic acid to amino group of the diamine compound is preferably 0.2 to 2, more preferably 0.3 to 1.4.

The polyimide used in the present invention is obtained by the imidization of the above polyamic acid under heat or in the presence of a dehydrating agent or an imidization catalyst. When the imidization is carried out under heat, the reaction temperature is generally between 60° and 200° C., preferably 100° and 170° C. When the reaction temperature is lower than 60° C., the reaction proceeds too slowly. When it is higher than 200° C., the molecular weight of the solvent-soluble polyimide is liable to decrease to a great extent. When the imidization is carried out in the presence of a dehydrating agent and an imidization catalyst, the imidization can be carried out in the above-described solvent. The reaction temperature is generally between 0° and 180° C., preferably between 60° and 150° C. The dehydrating agent can be selected from acid anhydrides such as acetic anhydride, propionic anhydride and trifluoroacetic anhydride. The imidization catalyst can be selected from tertiary amines such as pyridine, collidine, lutidine and triethylamine, while the imidization catalyst shall not be limited thereto. The amount of the dehydrating agent per mole of recurring unit of the polyamic acid is preferably 1.6 to 20 mol. The amount of the imidization catalyst per mole of the dehydrating agent is preferably 0.5 to 10 mol.

The polyamic acid and/or the polyimide obtained as described above have/has an inherent viscosity [η$_{inh}$ =ln η rel/C, C =0.5 g/dl, 30° C., in N-methyl-2-pyrrolidone; all of inherent viscosity values hereinafter were obtained by measurement under the same conditions]of generally 0.05 to 10 dl/g, preferably 0.05 to 5 dl/g.

In combination with the above organic solvent, any one of poor solvents such as alcohols, ketones, esters, ethers, halogenated hydrocarbons and hydrocarbons may be used in such an amount that the polymer formed does not precipitate. Examples of the poor solvents include methyl alcohol, ethyl alcohol, isopropyl alcohol, cyclohexanol, ethylene glycol, propylene glycol, 1,4-butanediol, triethylene glycol, acetone, methyl ethyl ketone, methyl isobutyl ketone, cyclohexanone, methyl acetate, ethyl acetate, butyl acetate, diethyl oxalate, diethyl malonate, diethyl ether, methyl cellosolve, ethyl cellosolve, ethylene glycol-n-propyl ether, ethylene glycol-i-propyl ether, butyl cellosolve, ethylene glycol dimethyl ether, ethylene glycol ethyl ether acetate, diethylene glycol dimethyl ether, tetrahydrofuran, dichloromethane, 1,2dichloroethane, 1,4-dichlorobutane, trichloroethane, chlorobenzene, o-dichlorobenzene, hexane, heptane, octane, benzene, toluene and xylene.

The specific polymer used in the present invention is obtained by the radical polymerization of an unsaturated carboxylic acid and/or unsaturated carboxylic acid anhydride and other radical-polymerizable compound in a solvent.

Examples of the above unsaturated carboxylic acid include unsaturated monocarboxylic acids such as acrylic acid, methacrylic acid, crotonic acid, o-vinyl benzoic acid, m-vinyl benzoic acid, p-vinyl benzoic acid, α-chloromethyl acrylic acid, α-bromomethyl acrylic acid, α-trichloromethyl acrylic acid, α-methoxy acrylic acid, α-ethoxy acrylic acid, α-chloroacrylic acid, α-bromoacrylic acid, and α-fluoroacrylic acid; and unsaturated dicarboxylic acids such as maleic acid, fumaric acid, citraconic acid, mesaconic acid, itaconic acid, muconic acid, 3-vinylphthalic acid, 4-vinylphthalic acid, 1,4-cyclohexenedicarboxylic acid, 5-norbornene-2,3dicarboxylic acid, methyl-5-norbornene-2,3-dicarboxylic acid, 3,4,5,6-tetrahydrophthalic acid, 1,2,3, 6tetrahydrophthalic acid and dimethyltetrahydrophthalic acid. Of the above unsaturated carboxylic acids, preferred are acrylic acid, methacrylic acid, crotonic acid, maleic acid, fumaric acid, citraconic acid, mesaconic acid and itaconic acid. More preferred unsaturated carboxylic acids are acrylic acid and methacrylic acid. Examples of the unsaturated carboxylic acid anhydride include maleic anhydride, itaconic anhydride, muconic anhydride, vinylphthalic anhydride, 1,4-cyclohexene dicarboxylic anhydride, 5-norbornene-2,3-dicarboxylic anhydride, methyl-5-norbornene-2,3-dicarboxylic anhydride, citraconic anhydride, mesaconic anhydride, fumalic anhydride, 3vinylphthalic anhydride and 4-vinylphthalic anhydride. Preferred unsaturated carboxylic are maleic anhydride and itaconic anhydride.

Examples of the other radical-polymerizable compound include radical-polymerizable compounds having epoxy group and monoolefin unsaturated compounds.

Examples of the radical-polymerizable compounds having epoxy group include glycidyl acrylate, glycidyl methacrylate, glycidyl α-ethylacrylate, glycidyl α-n-propylacrylate, glycidyl α-n-butylacrylate, 3,4-epoxybutyl acrylate, 3,4-epoxybutyl methacrylate, 6,7-epoxyheptyl acrylate, 6,7-epoxyheptyl methacrylate, 6,7-epoxyheptyl α-ethylacrylate, N-[4(2,3-epoxypropoxy)-3,5-dimethylbenzyl]acrylamide and N-[4-(2,3-epoxypropoxy)-3,5-dimethylphenylpropyl] acrylamide.

Examples of the monoolefin unsaturated compounds include alkyl methacrylates such as methyl methacrylate, ethyl methacrylate, n-butyl methacrylate, sec-butyl methacrylate and tert-butyl methacrylate; alkyl acrylates such as methyl acrylate and isopropyl acrylate; cycloalkyl methacrylates such as cyclohexyl methacrylate, 2-methylcyclohexyl methacrylate, cyclopentanyl methacrylate, dicyclopentanyl methacrylate, dicyclopentanyloxyethyl methacrylate and isobornyl methacrylate; cycloalkyl acrylates such as cyclohexyl acrylate, 2-methylcyclohexyl acrylate, dicyclopentanyl acrylate, dicyclopentanyloxyethyl acrylate and isobornyl acrylate; aryl methacrylates such as phenyl methacrylate and benzyl methacrylate; aryl acrylates such as phenyl acrylate and benzyl acrylate; diesters of dicarboxylic acids such as diethyl maleate, diethyl fumarate and diethyl itaconate; hydroxyalkyl esters such as 2-hydroxyethyl methacrylate and 2-hydroxypropyl methacrylate; unsaturated aliphatic hydrocarbon compounds such as butadiene and isoprene; styrene derivatives such as styrene, α-methylstyrene, o-methylstyrene, m-methylstyrene, p-methylstyrene and p-methoxystyrene; nitrile-containing unsaturated compounds such as acrylonitrile and methacrylonitrile; halogen-containing unsaturated compounds such as vinyl chloride and vinylidene chloride; amide-group-containing unsaturated compounds such as acrylamide and methacrylamide; and vinyl ester compounds such as vinyl acetate and vinyl propionate. Of the above compounds, preferred are alkyl acrylates, alkyl methacrylates, unsaturated aliphatic hydrocarbon compounds and styrene derivatives.

In the specific polymer, the content of unit derived from the unsaturated carboxylic acid or the unsaturated carboxylic acid anhydride is preferably 5 to 60% by weight, particularly preferably 10 to 50% by weight. When the above content is less than 5% by weight, the copolymer obtained cannot be easily dissolved in an alkaline aqueous solution, a remaining resin is liable to occur, and it is hence difficult to prepare an adequate pattern. When it exceeds 60% by weight, the copolymer obtained shows too high solubility in an alkaline aqueous solution, and a portion to be exposed to radiation is dissolved. That is, it is difficult to prevent a film thickness loss phenomenon.

In the specific polymer, the content of unit from the radical-polymerizable compound having epoxy group is preferably 0 to 70% by weight, particularly preferably 0 to 50% by weight. When the above content exceeds 70% by weight, the specific polymer is liable to have a problem on its shelf life.

In the specific polymer, the content of unit from the monoolefin unsaturated compound is preferably 10 to 95% by weight, particularly preferably 30 to 85% by weight. When the above amount is less than 10% by weight, gelation is liable to take place during the polymerization. When it exceeds 95% by weight, the amount of the unsaturated carboxylic acid or the unsaturated carboxylic acid anhydride is relatively small, and the resin sometimes shows a decreased solubility in an alkaline aqueous solution.

Examples of the solvent used for the polymerization of the specific polymer include alcohols such as methanol and ethanol; ethers such as tetrahydrofuran, glycol ethers such as ethylene glycol monomethyl ether; cellosolve esters such as methyl cellosolve acetate; and others such as aromatic hydrocarbons, ketones and esters.

The polymerization catalyst for the radical polymerization can be selected from general radical polymerization initiators. Examples of the polymerization catalyst include azo compounds such as 2,2'-azobisisobutyronitrile, 2,2'-azobis-(2,4-dimethylvaleronitrile and 2,2'-azobis-(4-methoxy-2,4dimethylvaleronitrile); organic peroxides such as benzoyl peroxide, lauroyl peroxide, tert-butylperoxypivalate and 1,1-bis-(tert-butylperoxy)cyclohexane; and hydrogen peroxide. When peroxide is used as a radical polymerization initiator, it may be combined with a reducing agent and used as a redox type initiator.

The molecular weight and molecular weight distribution of the above specific polymer are not specially limited so long as a solution thereof can be uniformly applied.

The radiation-sensitive, acid-forming compound used in the present invention is a compound which generates acid when exposed to radiation. Examples thereof include 1,2-benzoquinonediazidesulfonic acid ester, 1,2-naphthoquinonediazidesulfonic acid ester, 1,2-benzoquinonediazidesulfonic acid amide and 1,2-naphthoquinonediazidesulfonic acid amide. Specifically, the radiation-sensitive, acid-forming compound includes 1,2-quinonediazide compounds described in "Light-Sensitive Systems" by J. Kosar, 339-352 (1965), John Wiley & Sons (New York) and "Photoresist" by W. S. De Forest, 50 (1975), McGraw Hill, Inc (New York).

Of these compounds, preferred are 1,2-naphthoquinonediazide-4 or 5-sulfonic acid ester such as 1,2-dihydroxydiphenylmethane, 2,4'dihydroxydiphenylmethane and 4,4'-dihydroxydiphenylmethane; 1,2-naphthoquinonediazide-4 or 5-sulfonic acid ester such as 1-(4-hydroxyphenyl)-1-(4'hydroxyphenyl)ethane; 1,2-naphthoquinonediazide-4 or 5-sulfonic acid ester such as 2-(4'-hydroxyphenyl)-2(4'-hydroxyphenyl)propane; 1,2-naphthoquinonediazide-4 or 5-sulfonic acid ester such as 2,3,4-trihydroxybenzophenone, 2,4,6-trihydroxybenzophenone, 2,3,4,4'-tetrahydroxybenzophenone and 2,3,4,2',4'pentahydroxybenzophenone; 1,2-naphthoquinonediazide-4 or 5-sulfonic acid ester such as 2,2',2"- trihydroxyytriphenylmethane, 2,2',4"-trihydroxyytriphenylmethane, 2,4',4"-trihydroxyytriphenylmethane and 4,4',4"-trihydroxyytriphenylmethane; 1,2-naphthoquinonediazide-4 or 5-sulfonic acid ester such as 2,2',2"-trihydroxytriphenylethane, 2,2',4"-trihydroxytriphenylethane, 2,4',4"-trihydroxytriphenylethane and 4,4',4"-trihydroxytriphenylethane, 1,2-naphthoquinonediazide-4 or 5-sulfonic acid ester such as (4-(1,1-dimethyl-1-(p-hydroxyphenyl)methyl)phenyl)-bis(p-hydroxyphenyl)methane; and 1,2-naphthoquinonediazide-4 or 5-sulfonic acid ester such as 1-(4-(p-hydroxyphenylmethyl)phenyl)2,2-bis(p-hydroxyphenyl)ethane.

The amount of the radiation-sensitive, acid-forming compound per 100 parts by weight of the specific polymer is preferably 5 to 100 parts by weight, more preferably 10 to 80 parts by weight and particularly more preferably 10 to 50 parts by weight. When the above amount is less than 5 parts by weight, the amount of acid which this compound generates by the absorption of radiation is small, and it is hence difficult to make a difference in the solubility in the alkaline aqueous solution between the compound before the exposure to radiation and the exposed compound, so that patterning is difficult. When the above amount exceeds 100 parts by weight, the greater portion of the radiation-sensitive, acid-forming compound remains intact after the exposure to radiation for a short period of time, and in some cases, the effect of insolubilization in the alkaline solution is too high to carry out the development.

The radiation-sensitive resin composition used in the present invention contains the above specific polymer and the above radiation-sensitive, acid-forming compound. For adjusting the hardness of a film, the composition may further contain the following (meth)acryl compound and epoxy compound in combination.

The (meth)acryl compound is used for further improving the formed film in hardness and heat resistance, since it forms a polymer itself at the time of final heating. The (meth)acryl compound is selected from monofunctional (meth)acrylates, difunctional (meth)acrylates and trifunctional or higher (meth)acrylates.

The monofunctional (meth)acrylate can be selected from those which are commercially available, for example, in the trade names of Aronix M-101, 111 and 114 (supplied by Toagosei Chemical Industries Co., Inc.), KAYARAD TC-110S and TC-120S (supplied by Nippon Kayaku Co., Ltd), and V158 and V2311 (supplied by Osaka Organic Chemical Industries, Ltd). The difunctional (meth)acrylate can be selected from those which are commercially available, for example, in the trade names of Aronix M-120, M-240 and M-6200 (supplied by Toagosei Chemical Industries Co., Ltd.), KAYARAD HDDA, X-220 and R-604 (supplied by Nippon Kayaku Co., Ltd), and V260, V312 and V335HP (supplied by Osaka Organic Chemical Industries, Ltd). The trifunctional or higher (meth)acrylate can be selected from those which are commercially available, for example, in the trade names of Aronix M-400, M-405, M-450, M-7100, M-8030 and M-806 (supplied by Toagosei Chemical Industries Co., Ltd.), KAYARAD TMPTA, DPCA-20, -30, -60 and -120 (supplied by Nippon Kayaku Co., Ltd) and VGPT (supplied by Osaka Organic Chemical Industries, Ltd).

The amount of the (meth)acryl compound per 100 parts by weight of the specific polymer is preferably 0 to 100 parts by weight, particularly preferably 0 to 30 parts by weight. When the above amount exceeds 100 parts by weight, the compatibility is poor, and the formed film may have a toughened surface.

The epoxy compound is used for adjusting the reaction point between the specific compound and acid generated from the radiation-sensitive, acid-forming compound by the exposure to radiation at the time of final heating.

Examples of the above epoxy compound include a bisphenol A type epoxy resin, a phenol novolak type epoxy resin, a cresol novolak type epoxy resin, a alicyclic epoxy resin, a glycidyl ester-containing epoxy resin, a glycidyl amine-containing epoxy resin and a heterocyclic epoxy resin.

The bisphenol A type epoxy resin can be selected from those which are commercially available, for example, in the trade names of Epikote 1001, 1002, 1003, 1004, 1007, 1009 and 1010 (supplied by Yuka Shell Epoxy Kabushiki Kaisha). The bisphenol F type epoxy resin can be selected from those which are commercially available, for example, in the trade names of Epikote 807(supplied by Yuka Shell Epoxy Kabushiki Kaisha) and a bisphenol AD type epoxy resin. The phenol novolak type epoxy resin is commercially available, for example, in the trade names of Epikote 152 and 154(supplied by Yuka Shell Epoxy Kabushiki Kaisha) and EPPN-201 and 202(Nippon Kayaku Co., Ltd). The cresol novolak type epoxy resin can be selected from those which are commercially available, for example, in the trade names of EOCN-102S, 103S, 104S, 1020, 1025 and 1027(supplied by Nippon Kayaku Co., Ltd) and Epikote 180S75(supplied by Yuka Shell Epoxy Kabushiki Kaisha). The alicyclic epoxy resin can be selected from those which are commercially available, for example, in the trade names of CY-175, 177 and 179(supplied by Ciba Geigy) and ERL-4234, 4299, 4221 and 4206(supplied by U. C. C.). The glycidyl ester-containing epoxy resin can be selected from those which are commercially available, for example, in the trade names of Shodain 508(supplied by Showa Denko K.K.), Araldite CY-182, 192 and 184(supplied by Ciba Geigy), Epiclon 200 and 400(supplied by Dainippon Ink & Chemicals, Inc.), Epikote 871 and 872(supplied by Yuka Shell Epoxy Kabushiki Kaisha) and ED-5661 and 5662(Celanese Coating). The glycidylamine-containing epoxy resin can be selected commercially available products which are, for example, tetraglycidyldiaminodiphenylmethane, triglycidyl-p-aminophenol, triglycidyl-m-aminophenol, diglycidylaniline, diglycidyltoluidine, tetraglycidyl-m-xylylenediamine, diglycidyltribromoaniline and tetraglycidylbisaminomethylcyclohexane. The heterocyclic epoxy resin can be selected from those which are commercially available, for example, in the trade names of Araldite PT810(supplied by Ciba-Geigy), Epikote REX-15(supplied by Yuka Shell Epoxy Kabushiki Kaisha) and EPITEC (supplied by Nissan Chemical Industries Ltd.).

Most of the above-described epoxy compounds have high molecular weights, while the epoxy compound used in the present invention shall not be limited by the molecular weight. For example, compounds having low molecular weights, such as diglycidyl ether of bisphenol A or bisphenol F may be used.

Of the above epoxy compounds, preferred are a phenol novolak type epoxy resin, an alicyclic epoxy resin and a glycidyl ester-containing epoxy resin, since they are hardly colored after treated under heat.

The amount of the above epoxy compound per 100 parts by weight of the specific polymer is preferably 0 to 100 parts by weight, more preferably 0 to 50 parts by weight. When the above amount exceeds 100 parts by weight, the compatibility is poor, and the formed film may have a toughened surface.

The radiation-sensitive resin composition may further contain a surfactant for improving the film in uniformity. The surfactant can be selected from fluorine-containing surfactants which are commercially available in the trade names of BM-1000 and BM-1100(supplied by BM Chemical Co.), Megafac F142D, F172, F173 and F183(supplied by Dainippon Ink & Chemicals, Inc.), Fluorad FC-135, FC-170C, FC-430 and FC-431(supplied by Sumitomo 3M Co., Ltd.), and Surflon S-112, S-113, S-131, S-141 and S-145(supplied by Asahi Glass Co., Ltd.). The amount of the above surfactant per 100 parts by weight of the specific polymer is preferably 0 to 5 parts by weight, more preferably 0 to 2 parts by weight.

The radiation-sensitive resin composition used in the present invention can be easily prepared by uniformly mixing the above-described components. When the components are mixed, they are dissolved in a proper solvent and the composition is used in the form of a solution. The solvent is selected from those which can homogeneously dissolve the specific polymer and the radiation-sensitive resin composition and reacts with no component.

The above solvent can be selected from alcohols such as methanol and ethanol; ethers such as tetrahydrofuran; glycol ethers such as ethylene glycol monomethyl ether and ethylene glycol monoethyl ether; ethylene glycol alkyl ether acetates such as methyl cellosolve acetate and ethyl cellosolve acetate; diethylene glycols such as diethylene glycol monomethyl ether, diethylene glycol monoethyl ether and diethylene glycol dimethyl ether; propylene glycol alkyl ether acetates such as propylene glycol methyl ether acetate and propylene glycol propyl ether acetate; aromatic hydrocarbons such as toluene and xylene; ketones such as methyl ethyl ketone, cyclohexanone and 4-hydroxy-4-methyl-2-pentanone; and esters such as ethyl 2-hydroxypropionate, ethyl 2-hydroxy-2-methylpropionate, methyl 2-hydroxy-2-methylpropionate, ethyl ethoxyacetate, ethyl hydroxyacetate, methyl 2-hydroxy-3-methylbutanoate, methyl 3-methoxypropionate, ethyl 3-methoxypropionate, ethyl 3-ethoxypropionate, methyl 3-ethoxypropionate, ethyl acetate and butyl acetate.

Further, the following solvent having a high boiling point may be used in combination, such as N-methylformamide, N,N-dimethylformamide, N-methylformanilide, N-methylacetamide, N,N-dimethylacetamide, N-methyl-2-pyrrolidone, dimethylsulfoxide, benzyl ethyl ether, dihexyl ether, acetonylacetone, isophorone, caproic acid, caprylic acid, 1-octanol, 1-nonanol, benzyl alcohol, benzyl acetate, ethyl benzoate, diethyl oxalate, diethyl maleate. γ-butyrolactone, ethylene carbonate, propylene carbonate and phenyl cellosolve acetate.

Of the above solvent, in view of solubility, reactivity with each component and easiness to form a film, preferred are glycol ethers such as ethylene glycol monoethyl ether; ethylene glycol alkyl ether acetates such as ethyl cellosolve acetate; esters such as ethyl 2-hydroxypropionate; and diethylene glycols such as diethylene glycol monomethyl ether.

A solution of the above composition may be prepared by separately preparing a solution of the specific polymer, a solution of the radiation-sensitive, acid-forming compound and a solution of other components and mixing these solutions in predetermined amounts when the radiation-sensitive resin composition is used.

The so-prepared solution of the composition may be filtered through a millipore filter having an opening diameter of 0.2 μm before use.

Examples of the alkaline compound used in the present invention include inorganic alkalis such as sodium hydroxide, potassium hydroxide, sodium carbonate, sodium silicate, sodium metasilicate and aqueous ammonia; primary amines such as ethylamine and n-propylamine; secondary amines such as diethylamine and di-n-propylamine; tertiary amines such as trimethylamine, dimethylethylamine, triethylamine, methyldiethylamine, tri-n-propylamine, N,N,N', N'-tetramethyldimethyldiaminomethane and N,N,N',N'-tetramethyldiaminoethane; alcoholamines such as dimethyl ethanolamine, methyl diethanolamine, ethyl diethanolamine and triethanolamine; quaternary ammonium salts such as tetraammonium hydroxide, tetramethylammonium hydroxide, tetraethylammonium hydroxide and choline; and cycloamines such as pyrrole, piperidine, pyridine, cholidine, lutidine, quinoline, N-methylpiperidine, N-ethylpiperidine, N-methylpyrrolidine, N-ethylpyrrolidine, N-methylmorpholine, 1,8-diazabicyclo- [5.4.0]7-undecene and 1,5-diazabicyclo-[4.3.0]-5-nonane. Of the above alkaline compounds, preferred are tertiary amines, alcoholamines, quaternary ammonium salts and cycloamines. More preferred alkaline compound are tertiary amines, alcoholamines and cycloamines. Further, the developer solution may contain a water-soluble organic solvent such as methanol or ethanol and a surfactant so long as the developer solution is not deteriorated in developing properties.

In the invention, the concentration of an aqueous solution containing the alkaline compound is generally 0.01 to 1.5% by weight, preferably 0.01 to 1.0% by weight, more preferably 0.05 to 1.0% by weight.

The liquid crystal display device according to the method for domain-dividing a liquid crystal alignment film, provided by the present invention, can be produced, for example, by the following method.

First, there is prepared a substrate on which a transparent electrically conductive film is formed, a liquid crystal aligning agent is applied to the transparent electrically conductive film surface of the substrate by printing, and the applied agent is heated at a temperature between 80° and 350° C., preferably between 120° and 300° C., to form a film. The thickness of this film is generally 0.001 to 1 μm, preferably 0,005 to 0.5 μm.

The above-formed film is subjected to a rubbing treatment with a roll wound with a fabric of a synthetic fiber such as nylon.

Then, the radiation-sensitive resin composition is applied onto the liquid crystal alignment film by a spin coating method or a printing method, and heated at a temperature between 50° and 180° C., preferably 50° and 120° C. to form a film. The thickness of this film is generally 0.1 to 10 μm, preferably 0.3 to 5 μm.

Then, the film of the radiation-sensitive resin composition formed on the liquid crystal alignment film is exposed, for example, to ultraviolet light through a mask of a predetermined pattern and developed with a developer solution to remove an unnecessary portion and form a pattern, whereby the liquid crystal alignment film is partially protected.

The time required for the development is generally 10 to 240 seconds, and the development can be carried out by any one of a liquid pouring method and a dipping method. The developed pattern is cleaned with running water for 30 to 180 seconds and air-dried with compressed air or compressed nitrogen to remove an unnecessary portion, whereby the pattern is formed.

Then, the substrate on which the liquid crystal alignment film is partially protected is subjected to a rubbing treatment which is carried out in the direction reverse to the direction in the previous rubbing treatment.

Then, the so-obtained substrate is washed with a solution such as methyl isobutyl ketone, which can dissolve the radiation-sensitive resin composition but cannot dissolve the liquid crystal alignment film, whereby the radiation-sensitive resin composition alone is removed.

The substrate on which the liquid crystal alignment film is formed as above is formed into a liquid crystal display device as follows. Two substrates on which the liquid crystal alignment film is formed each are faced each other such that the rubbing direction of one liquid crystal alignment film is at right angles with, or in antiparallel with, the rubbing direction of the other liquid crystal alignment film, and marginal portions of the substrates are sealed with a sealing agent. A liquid crystal is charged, and the charging aperture is sealed to prepare a liquid crystal cell. A polarizer plate is attached to one surface of the cell and another polarizer is attached to the other surface of the cell such that the polarization directions of the polarizers are in parallel with, or at right angles with, the rubbing directions of the liquid crystal alignment films, whereby a liquid crystal display device is obtained.

As the above sealing agent, there is used, for example, an epoxy resin containing a curing agent and aluminum oxide particles as spacers.

As the above liquid crystal, nematic liquid crystals and smectic liquid crystals are used. Of these, those which form nematic liquid crystals are preferred. Examples of the liquid crystal include Schiff's base liquid crystal, azoxy liquid crystal, biphenyl liquid crystal, phenylcyclohexane liquid crystal, ester liquid crystal, terphenyl liquid crystal, pyrimidine liquid crystal, dioxane liquid crystal, bicyclooctane liquid crystal and cubane liquid crystal. The liquid crystal may further contain cholestric liquid crystal such as cholesteryl chloride, cholesteryl nonate and cholesteryl carbonate and commercially available chiral agents such as C-15 and CB-15(trade name, supplied by Merck Ltd.). Further, a ferroelectric liquid crystal such as p-desiloxybenzylidene-p-amino-2-methylbutyl cinnamate may be used.

The polarizer, which are to be attached to the outside of the liquid crystal cell, includes a polarizer obtained by allowing a polyvinyl alcohol to absorb iodine, while stretching it, to form a polarization film called an H film and sandwiching the polarization film between protection films of cellulose acetate and a polarizer formed of the H film per se.

[EXAMPLES]

The present invention will be explained more in detail hereinafter with reference to Examples. However, the present invention shall not be limited to these Examples.

The voltage retention ratio of a liquid crystal display device was evaluated by applying a voltage of 5 V to the liquid crystal display device, opening the circuit and measuring the retained voltage after 16.7 msec. Further, the alignment of a liquid crystal display device was evaluated as follows; When the voltage was switched on and off, the liquid crystal display device was observed through a polarization microscope to see whether or not an unusual domain was present. A liquid crystal display device on which no unusual domain was present was taken as excellent.

Synthesis Example 1

44.8 Grams of 2,3,5-tricarboxycyclopentylacetic anhydride and 21.6 g of p-phenylenediamine were dissolved in 988 g of N-methyl-2-pyrrolidone, and allowed to react at room temperature for 6 hours.

Then, the reaction mixture was poured into a large excess of methanol to precipitate a reaction product. Then, the reaction product was washed with methanol, dried under reduced pressure at 40° C. for 15 hours to give 60.2 g of a polyamic acid Ia having an inherent viscosity of 1.44 dl/g.

Synthesis Example 2

30 Grams of the polyamic acid Ia obtained in Synthesis Example 1 was dissolved in 570 g of γ-butyrolactone, and 21.6 g of pyridine and 16.74 g of acetic anhydride were added. The mixture was allowed to react for imidization at 120° C. for 3 hours.

The reaction mixture was subjected to the precipitation in the same manner as in Synthesis Example 1 to give 24 g of a polyimide IIa.

Synthesis Example 3

A specific polymer Ib was obtained in the same manner as in Synthesis Example 1 except that the diamine was replaced with 39.6 g of 4.4'diaminodiphenylmethane. Further, a polyimide IIb having an inherent viscosity of 1.16 dl/g was obtained by carrying out the imidization using this specific polymer Ib in the same manner as in Synthesis Example 2.

Synthesis Example 4

50.5 Grams of a polyamic acid Ic having an inherent viscosity of 1.26 dl/g was obtained in the same manner as in Synthesis Example 1 except that the tetracarboxylic acid dianhydride was replaced with 39.22 g of cyclobutanetetracarboxylic dianhydride.

Synthesis Example 5

A flask was flushed with nitrogen, and then charged with 459 g of a solution of 9 g of 2,2'azobisisobutyronitrile in diethylene glycol dimethyl ether. Thereafter, the flask was charged with 22.5 g of styrene, 45 g of methacrylic acid, 67.5 g of dicyclopentanyl methacrylate and 90 g of glycidyl methacrylate, and the mixture was moderately stirred. The temperature of the solution was increased up to 80° C., and this temperature was maintained for 5 hours. Then, the reaction mixture was heated at 90° C. for 1 hour to finish the polymerization.

The reaction mixture was dropwise added to a large amount of water to coagulate a reaction product. This coagulation product was washed with water, redissolved in 200 g of tetrahydrofuran and coagulated in a large amount of water.

The above procedures of redissolving-coagulation were repeated three times, and the resultant coagulation product was dried under vacuum at 60° C. for 48 hours to give an intended polymer. Then, the intended polymer was dissolved in diethylene glycol to prepare a solution having a solid content of 25% by weight, whereby a specific polymer solution a was obtained.

Synthesis Example 6

A flask was flushed with nitrogen, and then charged with 459 g of a solution of 9 g of 2,2'azobis(2,4-dimethylvaleronitrile) in diethylene glycol dimethyl ether.

Thereafter, the flask was charged with 45 g of methacrylic acid, 90 g of dicyclopentanyl methacrylate and 90 g of glycidyl methacrylate, and the mixture was moderately stirred. The temperature of the solution was increased up to 80° C., and this temperature was maintained for 5 hours. Then, the reaction mixture was heated at 90° C. for 1 hour to finish the polymerization. Then, the reaction mixture was treated in the same manner as in Synthesis Example 5 to give a specific polymer solution b.

Synthesis Example 7

A flask was flushed with nitrogen, and then charged with 459 g of a solution of 9 g of 2,2'azobisisobutyronitrile in diethylene glycol dimethyl ether.

Thereafter, the flask was charged with 56.2 g of methacrylic acid, 101.2 g of sec-butyl methacrylate and 67.5 g of glycidyl methacrylate, and the mixture was moderately stirred. The temperature of the solution was increased up to 80° C., and this temperature was maintained for 5 hours. Then, the reaction mixture was heated at 90° C. for 1 hour to finish the polymerization. Then, the reaction mixture was treated in the same manner as in Synthesis Example 5 to give a specific polymer solution c.

Synthesis Example 8

A flask was flushed with nitrogen, and then charged with 459 g of a solution of 9 g of 2,2'azobisisobutyronitrile in methyl 3-methoxypropionate.

Thereafter, the flask was charged with 56.25 g of methacrylic acid, 90 g of methyl methacrylate and 78.75 g of 3,4-epoxybutyl methacrylate, and the mixture was moderately stirred. The polymerization was initiated at 80° C., and this temperature was maintained for 5 hours. Then, the reaction mixture was heated at 90° C. for 1 hour to finish the polymerization. Then, the reaction mixture was treated in the same manner as in Synthesis Example 5 to give a specific polymer solution d.

Synthesis Example 9

A flask was flushed with nitrogen, and then charged with 459 g of a solution of 9 g of 2,2'-azobisisobutyronitrile in diethylene glycol dimethyl ether.

Thereafter, the flask was charged with 45 g of maleic anhydride, 112.5 g of benzyl methacrylate and 67.5 g of N-[4-(2,3-epoxypropoxy)-3,5-dimethylphenylpropyl]acrylamide, and the mixture was moderately stirred. The polymerization was initiated at 80° C., and this temperature was maintained for 5 hours. Then, the reaction mixture was heated at 90° C. for 1 hour to finish the polymerization. Then, the reaction mixture was treated in the same manner as in Synthesis Example 5 to give a specific polymer solution e.

Synthesis Example 10

27.0 Grams of m-cresol, 52.2 g of 3,5xylenol, 130.3 g of a 37 wt % formaldehyde aqueous solution and 0.73 g of oxalic acid dihydrate were subjected to polycondensation in a separable flask at 100° C. for 35 minutes with stirring. Then, 108.0 g of m-cresol and 13.1 g of 3,5-xylenol were added, and the mixture was allowed to react for 2 hours. After the reaction, the pressure in the reactor was reduced to 30 to 40 mmHg, and water, oxalic acid, unreacted formaldehyde, m-cresol and 305-xylenol were removed. Then, the resultant resin was dissolved in ethyl cellosolve acetate to prepare a resin solution having a solid content of 20% by weight. Methanol in an amount twice as large as that of the resin solution and water in an amount equal to that of resin solution were added to the resin solution, and the mixture was stirred and allowed to stand. After the mixture was separated to two layers, the resin solution (lower layer) was recovered, concentrated, dehydrated and dried to recover a resin. The resin was dissolved in diethylene glycol to prepare a solution having a solid content of 25% by weight.

Synthesis Example 11

A flask was flushed with nitrogen, and then charged with 459 g of a solution of 9 g of 2,2'-azobisisobutyronitrile in 4-hydroxy-4-methyl-2-pentanone.

Thereafter, the flask was charged with 12.5 g of butadiene, 62.5 g of styrene, 102.5 g of methacrylic acid and 72.5 g of dicyclopentanyl methacrylate, and the mixture was moderately stirred. The temperature of the solution was increased up to 80° C., and this temperature was maintained for 5 hours. Then, the reaction mixture was heated at 90° C. for 1 hour to finish the polymerization. Then, the reaction mixture was treated in the same manner as in Synthesis Example 5 to give a specific polymer solution f.

Synthesis Example 12

A flask was flushed with nitrogen, and then charged with 459 g of a solution of 9 g of 2,2'-azobisisobutyronitrile in 4-hydroxy-4-methyl-2-pentanone.

Thereafter, the flask was charged with 62.5 g of styrene, 112.5 g of methacrylic acid and 72.5 g of dicyclopentanyl methacrylate, and the mixture was moderately stirred. The temperature of the solution was increased up to 80° C., and this temperature was maintained for 5 hours. Then, the reaction mixture was heated at 90° C. for 1 hour to finish the polymerization. Then, the reaction mixture was treated in the same manner as in Synthesis Example 5 to give a specific polymer solution g.

Preparation Example 1

13.64 Grams of diethylene glycol dimethyl ether was added to 100 g of the specific polymer solution a obtained in Synthesis Example 5. Further, 7.5 g of 1,2-naphthoquinonediazide-5-sulfonic acid ester of 4,4 '-[1-[4-(1-(4'-hydroxyphenyl)-1-methylethyl)phenyl]ethylidene]diphenol (average esterification ratio 66.7 mol %) was dissolved, and the resultant solution was filtered through a millipore filter having an opening diameter of 0.22 μm to give a preparation solution a.

Preparation Example 2

A preparation solution b was obtained in the same manner as in Preparation Example 1 except that the specific polymer solution a obtained in Synthesis Example 5 was replaced with the specific polymer solution b obtained in Synthesis Example 6.

Preparation Example 3

A preparation solution c was obtained in the same manner as in Preparation Example 1 except that the specific polymer solution a obtained in Synthesis Example 5 was replaced with the specific polymer solution c obtained in Synthesis Example 7.

Preparation Example 4

A preparation solution d was obtained in the same manner as in Preparation Example 1 except that the specific polymer solution a obtained in Synthesis Example 5 was replaced with the specific polymer solution d obtained in Synthesis Example 8.

Preparation Example 5

A preparation solution e was obtained in the same manner as in Preparation Example 1 except that the specific polymer solution a obtained in Synthesis Example 5 was replaced with the specific polymer solution e obtained in Synthesis Example 9.

Preparation Example 6

A preparation solution f was obtained in the same manner as in Preparation Example 1 except that the 1,2-naphthoquinonediazide-5-sulfonic acid ester of 4,4 '-[1-[4-(1-(4'-hydroxyphenyl)-l-methylethyl)-phenyl]ethylidene]diphenol (average esterification ratio 66.7 mol %) was replaced with 7.5 g of 1,2-naphthoquinonediazide-5-sulfonic acid ester of 2,3,4,4 '-tetrahydroxybenzophenone (average esterification ratio 75 mol %).

Preparation Example 7

A preparation solution g was obtained in the same manner as in Preparation Example 1 except that the specific polymer solution a obtained in Synthesis Example 5 was replaced with the solution obtained in Synthesis Example 10.

Preparation Example 8

A preparation solution h was obtained in the same manner as in Preparation Example 1 except that the specific polymer solution a obtained in Synthesis Example 5 was replaced with the specific polymer solution f obtained in Synthesis Example 11.

Preparation Example 9

A preparation solution i was obtained in the same manner as in Preparation Example 1 except that the specific polymer solution a obtained in Synthesis Example 5 was replaced with the specific polymer solution g obtained in Synthesis Example 12.

Example 1

5 Grams of the polyamic acid Ia obtained in Synthesis Example 1 was dissolved in N-methyl-2-pyrrolidone to prepare a solution having a solid content of 4% by weight. This solution was filtered through a filter having an opening diameter of 1 μm to prepare a liquid crystal aligning agent solution.

The above-prepared solution was applied on a transparent electrode surface of a glass substrate of which the transparent electrode was formed of an ITO film, with a printing machine for forming a liquid crystal alignment film, and dried at 180° C. for 1 hour to give a film having a dry thickness of 0.05 μm.

The above film was subjected to a rubbing treatment with a rubbing machine having a roll wound with a fabric of nylon, at a roll revolution rate of 500 rpm at a stage feed movement rate of 1 cm/sec.

Then, the preparation solution a (radiation-sensitive resin composition) obtained in Preparation Example 1 was applied onto the above liquid crystal alignment film by a spin coating method and dried at 100° C. for 30 minutes to form a film having a thickness of 1 μm.

Then, the film of the radiation-sensitive resin composition was exposed to light having a wavelength of 365 nm at an intensity of 100 mJ/cm$^2$ through a 100 μm×100 μm pattern mask, and developed with an aqueous solution containing 0.14% by weight of tetramethylammonium hydroxide (TMAH) for 60 seconds. The resultant substrate was cleaned with running water for 120 seconds and air-dried with compressed nitrogen.

Then, the substrate on which the liquid crystal alignment film was partially protected was subjected to a rubbing treatment in the direction traverse to the direction of the previous rubbing treatment.

Then, the so-prepared substrate was cleaned with methyl isobutyl ketone for 60 seconds.

An epoxy resin adhesive containing aluminum oxide particles having a diameter of 17 μm was applied, by screen printing, on marginal portions of two substrates each of which was coated with a rubbing-treated liquid crystal alignment film, prepared as above. These two substrates were stacked such that the liquid crystal alignment film surface of one substrate faced the counterpart of the other substrate and that the rubbing direction of one substrate was at right angles with the counterpart of the other substrate, and attached under pressure to cure the adhesive.

Then, a nematic liquid crystal (ZLI-4792, supplied by Merck) was charged into a space between the two substrate through a liquid crystal injection opening, and the liquid crystal injection opening was closed with an epoxy-containing adhesive. A polarizer was attached to one outer surface of the stack of the substrate, and another polarizer was attached to the other outer surface of the stack, such that the polarization directions of the polarizers were in parallel with the rubbing directions of the corresponding liquid crystal alignment films of the substrates to give a liquid crystal display device. The liquid crystal display device showed excellent liquid crystal alignment properties.

The voltage retention ratio of the liquid crystal display device was as high as 98.2% (20° C.).

Examples 2–11

Liquid crystal cells were obtained in the same manner as in Example 1 except that the polyamic acids, polyimides obtained in Synthesis Examples 1 to 4 were used for liquid crystal alignment films, that the preparation solutions a to f obtained in Preparation Examples 1 to 6 were used as radiation-sensitive resin compositions and that the concentration of TMAH was changed. Then, liquid crystal display devices were prepared in the same manner as in Example 1, and evaluated for alignment properties and voltage retention ratios. Table 1 shows the results. Examples 12 –16

Liquid crystal cells were obtained in the same manner as in Example 1 except that the polyimide IIa obtained in Synthesis Example 2 was used for liquid crystal alignment films, that the preparation solutions h and i obtained in Preparation Examples 8 and 9 were used as radiation-sensitive resin compositions and that the kind and the concentration of the developer solution were changed. Then, liquid crystal display devices were prepared in the same manner as in Example 1, and evaluated for alignment properties and voltage retention ratios. Table 2 shows the results.

TABLE 1

| Example | Liquid crystal alignment film | Preparation solution | Concentration of TMAH aqueous solution (wt %) | Alignment properties of liquid crystal | Voltage retention ratio (%. 20° C.) |
| --- | --- | --- | --- | --- | --- |
| 2 | polyimide IIa | a | 0.14 | excellent | 98.0 |
| 3 | polyimide IIb | a | 0.14 | " | 97.9 |
| 4 | polyimide Ic | a | 0.14 | " | 97.5 |
| 5 | polyimide IIb | a | 0.05 | " | 98.1 |
| 6 | polyimide IIb | a | 0.80 | " | 97.2 |
| 7 | polyimide IIb | b | 0.14 | " | 97.8 |
| 8 | polyimide IIb | c | 0.14 | " | 98.0 |
| 9 | polyimide IIb | d | 0.14 | " | 97.6 |
| 10 | polyimide IIb | e | 0.14 | " | 98.0 |
| 11 | polyimide IIb | f | 0.14 | " | 97.8 |

TABLE 2

| Example | Preparation solution | Developer solution | Alignment properties of liquid crystal | Voltage retention ratio (%. 20° C.) |
| --- | --- | --- | --- | --- |
| 12 | h | Aqueous solution containing 1 wt. % of N-methyl-piperidine | excellent | 98.8 |
| 13 | h | Aqueous solution containing 1 wt. % of dimethyl-ethanolamine | " | 98.7 |
| 14 | h | Aqueous solution containing 0.7 wt. % of trimethylamine | " | 98.8 |
| 15 | i | Aqueous solution containing 0.8 wt. % of N-methyl-piperidine | " | 98.7 |
| 16 | i | Aqueous solution containing 0.8 wt. % of dimethyl-ethanolamine | " | 98.5 |

Comparative Example 1

A liquid crystal cell was prepared in the same manner as in Example 1 except that the preparation solution g obtained in Preparation Example 7 was used and that an aqueous solution containing 2.38% by weight of TMAH was used as a developer solution. The liquid crystal alignment properties were excellent, while the voltage retention ratio was as low as 90.1%.

Comparative Example 2

A liquid crystal cell was prepared in the same manner as in Example 1 except that the preparation solution a obtained in Preparation Example 1 was used and that an aqueous solution containing 2.0% by weight of TMAH was used as a developer solution. The liquid crystal alignment properties were excellent, while the voltage retention ratio was as low as 91.1%.

Comparative Example 3

A liquid crystal cell was prepared in the same manner as in Example 1 except that the preparation solution a obtained in Preparation Example 1 was used and that an aqueous solution containing 2.38% by weight of TMAH was used as a developer solution. The liquid crystal alignment properties were excellent, while the voltage retention ratio was as low as 87.2%.

According to the method for domain-dividing a liquid crystal alignment film, provided by the present invention, a liquid crystal display device having excellent electric properties and liquid crystal alignment properties can be obtained even when a pattern is formed on the liquid crystal alignment film.

Further, the liquid crystal display device produced according to the method for domain-dividing a liquid crystal alignment film, provided by the present invention, can be suitably used for TN (twisted nematic), STN (super twisted nematic), SH (super hemeotropic), ferroelectric and anti-ferroelectric liquid crystal display devices by selecting liquid crystals.

Furthermore, the liquid crystal display device produced according to the method for domain-dividing a liquid crystal alignment film, provided by the present invention, is excellent in reliability on alignment properties of liquid crystal and can be effectively used in a variety of devices such as a desk-top calculator, a watch, a clock, a count display, a word processor, a personal computer and a liquid crystal television set.

What is claimed is:

1. A method for domain-dividing a liquid crystal alignment film, which comprises (1) applying a radiation-sensitive resin composition onto a liquid crystal alignment film aligned in one direction and formed on a substrate, (2) exposing the radiation-sensitive resin composition to radiation in a predetermined pattern, (3) carrying out development of the resin composition with an aqueous solution containing 0.01 to 1.5% by weight of an alkaline compound, (4) aligning the portion of the liquid crystal alignment film not covered by the resin composition in another direction and (5) removing the radiation-sensitive resin composition.

2. A method according to claim 1, wherein a composition containing (A) a polymer containing an unsaturated carboxylic acid and/or an unsaturated carboxylic acid anhydride and (B) a radiation-sensitive, acid-forming compound which is acid-forming under exposure to radiation is used as the radiation-sensitive resin composition.

3. A liquid crystal device having a liquid crystal display device with a liquid crystal alignment film whose alignment is divided by the method as recited in claim 1.

4. A liquid crystal device according to claim 3, wherein the liquid crystal display device is selected from the group consisting of TN display device, STN display device and SH display device.

5. A method according to claim 1, wherein the liquid crystal alignment film is formed from at least one polymer selected from the group consisting of polyimide and polyamic acid.

6. A method according to claim 1, wherein the alkaline compound is at least one compound selected from the group consisting of a tertiary amine, an alcoholamine, a quaternary ammonium salt and a cycloamine.

7. A method according to claim 1, wherein the alkaline compound from at least one compound selected from the group consisting of a tertiary amine, an alcoholamine and a cycloamine.

8. A method according to claim 2, wherein the polymer comprises from 5–60% by weight of units derived from an unsaturated carboxylic acid or an unsaturated carboxylic acid anhydride.

9. A method according to claim 2, wherein the polymer comprises from 10 to 50% by weight of units derived from an unsaturated carboxylic acid or an unsaturated carboxylic acid anhydride.

10. A method according to claim 2, wherein the amount of the radiation-sensitive, acid-forming compound per 100 parts by weight of the polymer is 5 to 100 parts by weight.

11. A method according to claim 2, wherein the amount of the radiation-sensitive, acid-forming compound per 100 parts by weight of the polymer is 10 to 80 parts by weight.

12. A method according to claim 2, wherein the radiation-sensitive, acid-forming compound is 1,2quinonediazide.

13. A method according to claim 2, wherein the unsaturated carboxylic acid is at least one compound selected from the group consisting of acrylic acid and methacrylic acid.

14. A method according to claim 2, wherein the unsaturated carboxylic acid anhydride is at least one compound selected from the group consisting of maleic anhydride and itaconic anhydride.

15. A method according to claim 1, wherein said radiation in step (2) is ultraviolet radiation.

* * * * *